UNITED STATES PATENT OFFICE.

CHARLES CAMPBELL, OF CALIFORNIA.

IMPROVEMENT IN PROCESSES FOR PURIFYING AND CLEANSING WHEAT.

Specification forming part of Letters Patent No. 12,777, dated May 1, 1855.

*To all whom it may concern:*

Be it known that I, CHARLES CAMPBELL, of California, have discovered a new Process of Separating Smut and all Impurities from Wheat, of which the following is a specification.

Take of lime, newly slaked and while yet warm, one and a half pound to each one hundred pounds of wheat, mix the lime well with the wheat, let it stand one hour, then pass it through a smut-mill in the usual way. All the lime, smut, dirt, and impurities of every kind attached to the wheat, and which no smut-mill independent of my liming process will fully remove, will be entirely removed, and the flour be as white and as sweet as though made from the best of wheat.

What I claim as my discovery, for which I ask a patent, is not the smut-mill or improvement thereon, or any new chemical quality of lime; but it consists in the preparation of lime for this particular purpose and the application of it to wheat, when newly slaked and warm, so as to much more effectually cleanse the wheat from all impurities than by any other process.

CHARLES CAMPBELL.

Witnesses:
D. O. SHATTUCK,
C. SPENCER.